Mason C. Howell
INVENTOR.

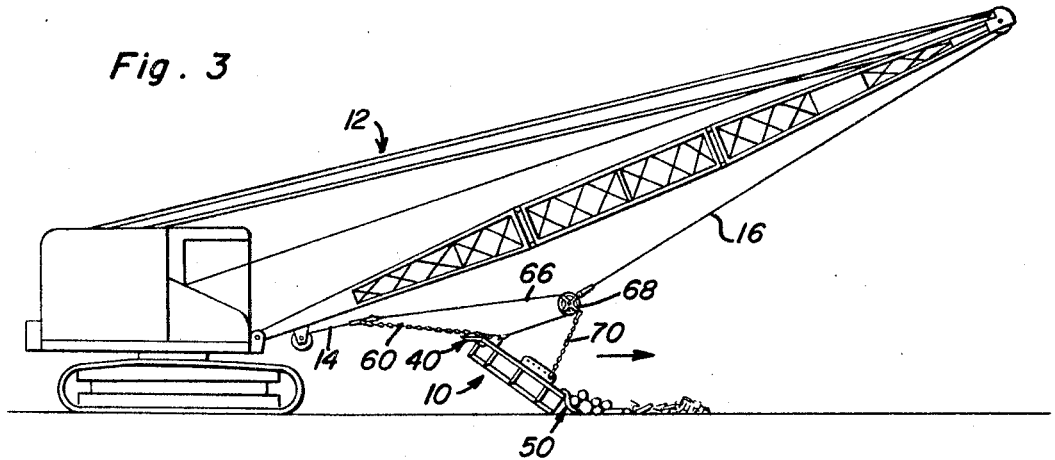
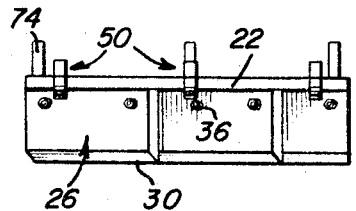
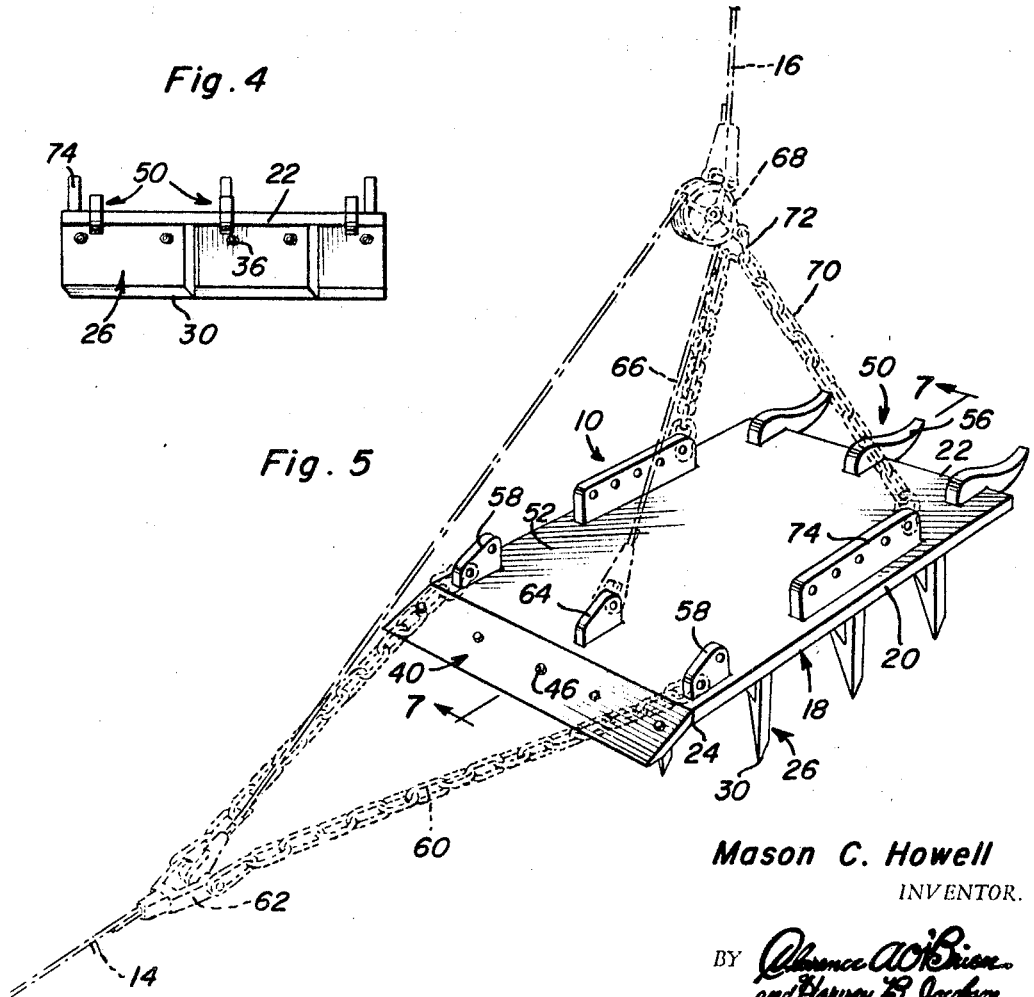

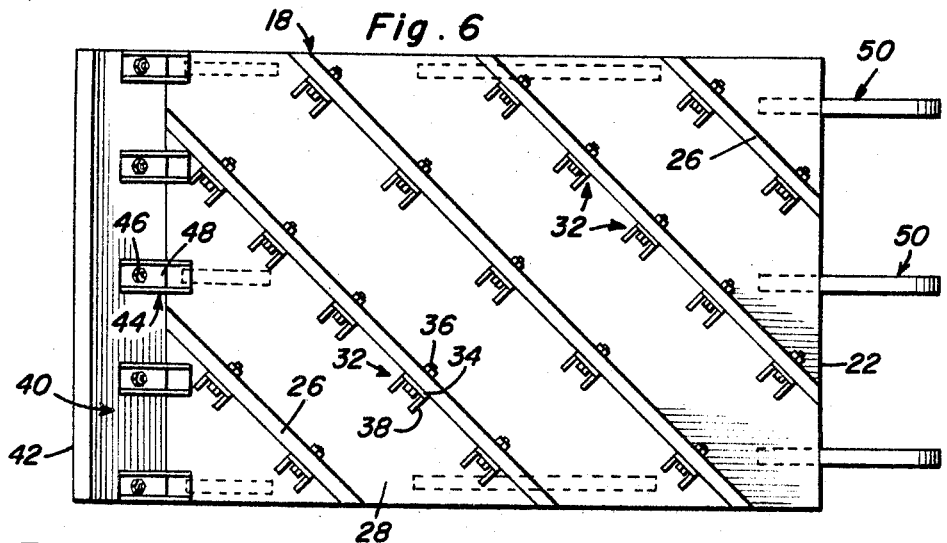
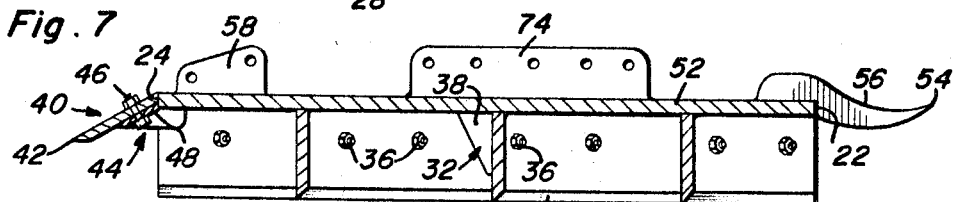
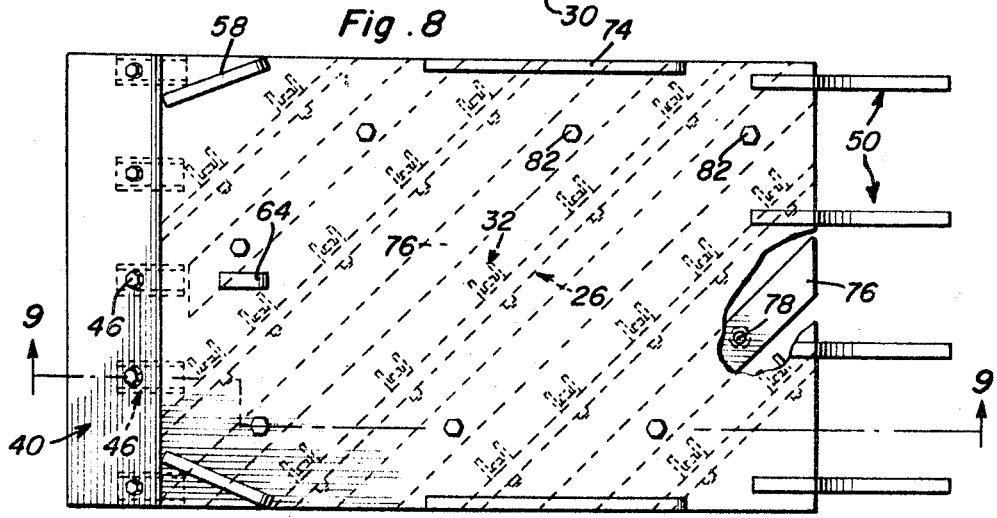
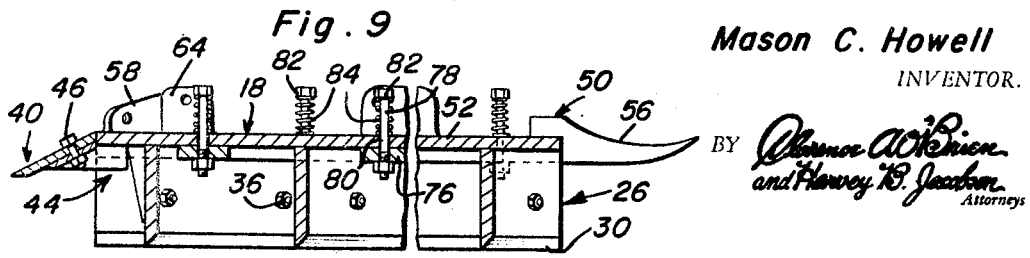
Mason C. Howell
INVENTOR.

United States Patent Office 3,445,945
Patented May 27, 1969

3,445,945
LAND CLEARING DEVICE
Mason C. Howell, P.O. Box 217,
Plant City, Fla. 33566
Filed Nov. 8, 1966, Ser. No. 592,853
Int. Cl. E02f 3/48, 3/60
U.S. Cl. 37—116                    8 Claims

ABSTRACT OF THE DISCLOSURE

A flat rectangular base plate having a plurality of elongated parallel chopping blades depending perpendicularly therefrom and orientated transversely thereacross. Outwardly extending tooth-like members are mounted on the front edge of the base plate at spaced points therealong for use as raking and lift means, and a cutting blade is mounted along the rear edge of the base plate whereby upon an orientation of the base plate with the cutting blade downwardly directed, a cutting of logs or the like can be effected through a sequential raising and lowering of the base plate. Mounting lugs are provided on top of the base plate for engagement with an appropriate overhead support, and spring-loaded cleanout bars are provided between the chopping blades.

The present invention is generally concerned with land clearing devices, and more particularly relates to a device, usable in conjunction with conventional dragline apparatus, for clearing thickly grown areas, swampy areas, and the like, which can normally not be worked by bulldozers.

It is a primary object of the instant invention to, in addition to providing a device operable in areas normally inaccessible to conventional land clearing apparatus such as bulldozers, eliminate the necessity of using hand labor to cut, pile and burn the brush and undergrowth.

In conjunction with the above object, it is an object of the instant invention to provide a device which substantially completely pulverizes all trees, bushes and undergrowth, grinding this matter into the ground so as to provide cleared areas with the necessity of further clearing or removal of the chopped matter being unnecessary. It should of course be appreciated that the elimination of the necesity of burning the materials gathered by bulldozers or hand labor, as is now required, eliminates a substantial fire hazard.

Another important object of the instant invention is the provision of apparatus which can, through an adjustment of the control lines associated therewith, perform all of the necessary operations, including chopping, cutting and raking, whereby a rapid and effective clearing of land is achieved with a minimum amount of effort and at a minimum expense for manpower and equipment.

Furthermore, it is an important object of the instant invention to provide land clearing apparatus which is uniquely adapted for work on dredge banks and in swampy areas through the utilization of dragline equipment for effecting a manipulation and positioning of the clearing unit itself.

Also, a specific object of the instant invention resides in the provision of a unique chopping unit which can be utilized in disposing of substantially any type of growth to be encountered, including larger logs. For example, the cleaning device can, through an elongated cutter bar provided thereon, chop the logs into disposable segments, or, utilizing the raking teeth, remove the logs, or like bulky material, away from the path of the dragline equipment, and in fact away from the area being cleared.

Basically, in order to achieve these particular objects, it is contemplated that the chopping unit of the instant invention, this unit being utilized preferably in conjunction with conventional dragline equipment, consist of an enlarged rectangular plate having a plurality of diagonal chopping blades depending from the under-surface thereof, an elongated cutting blade affixed to one end thereof for use upon a substantially vertical orientation of the plate, and a plurality of raking teeth mounted on the second end of the plate. In addition, suitable cable receiving mounting lugs or hitches are secured to the upper surface of the plate. The entire unit will in effect be self-cleaning particularly in light of a certain amount of vibration or agitation which will be effected through the operation of the hoist equipment of the dragline. In addition to this, it is contemplated that in one form of the unit a plurality of spring-biased cleaning bars will be provided for vertical reciprocation between the chopping blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a side elevational view with the dragline and clearing unit orientated for a raking or removal operation;

FIGURE 4 is an end elevational view of the clearing or chopping unit itself;

FIGURE 5 is a perspective view of the unit with the draglines illustrated in a typical hook-up;

FIGURE 6 is a bottom view of the clearing unit;

FIGURE 7 is a cross sectional view taken substantially on a plane passing along line 7—7 in FIGURE 5;

FIGURE 8 is a top plan view of a modified form of unit with a portion broken away for purposes of illustration; and FIGURE 9 is a partial cross-sectional view taken substantially on a plane passing along line 9—9 in FIGURE 8.

Figure 1:
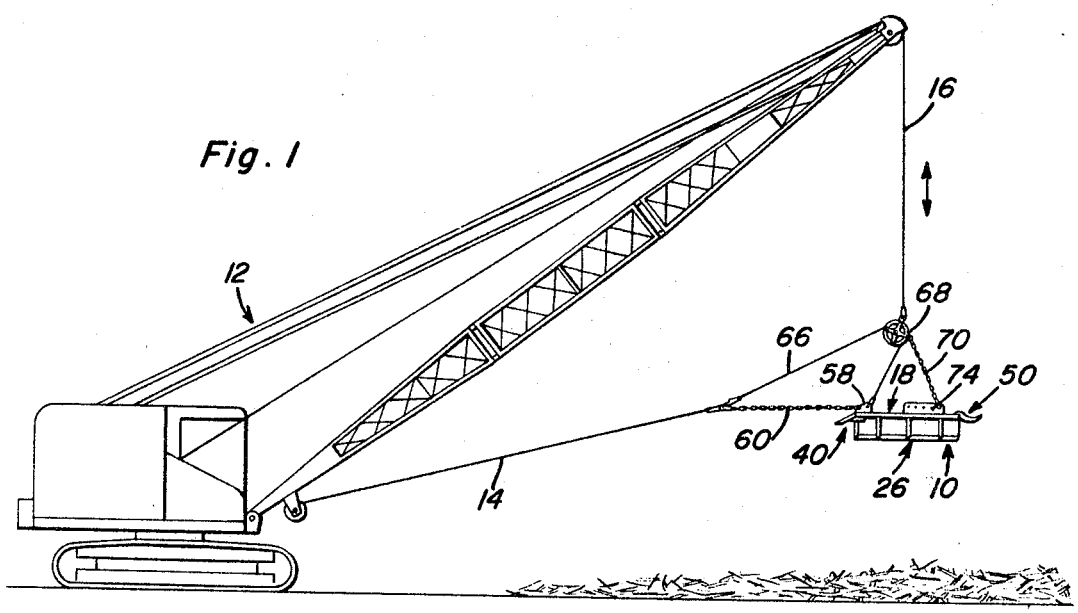
FIGURE 1 is a side elevational view of the dragline mounted unit orientated in the normal chopping and clearing position.
Figure 2:
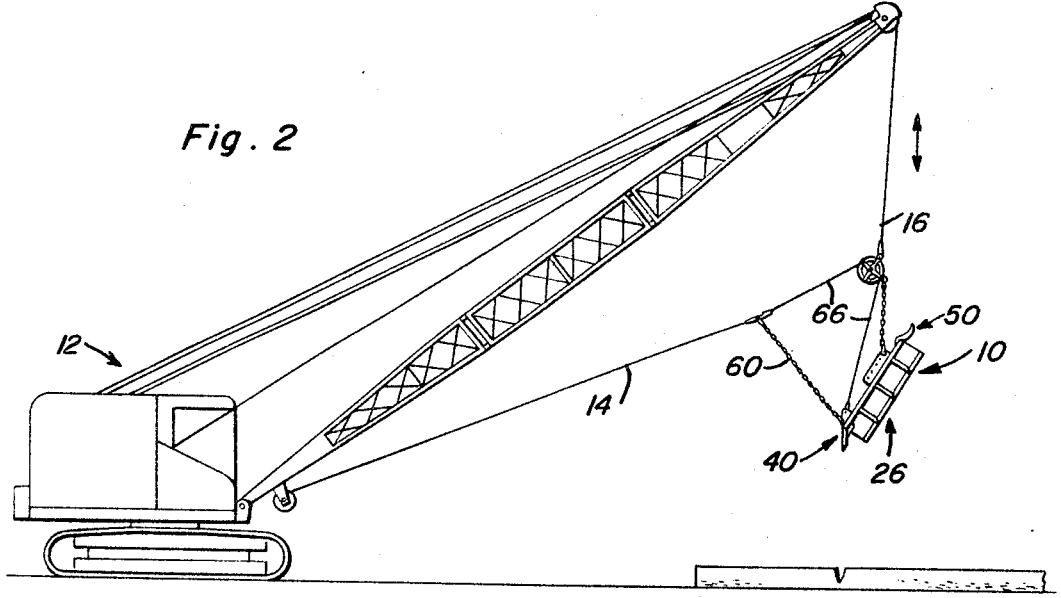
FIGURE 2 is a side elevational view with the unit orientated for cutting operations utilizing the end mounted cutting blade.

Referring now more specifically to the drawings, reference numeral 10 is used to generally designate the clearing or chopping unit of the instant invention. This unit 10 is particularly adapted for use in conjunction with a dragline machine 12 for control and manipulation thereby utilizing the dragline provided drag cable 14 and hoist cable 16 as best seen in FIGURES 1,2 and 3.

Basically, the clearing unit 10 comprises a flat enlarged rectangular plate 18 defined by opopsed parallel side edges 20, a front end edge 22 and a rear end edge 24.

The normal chopping and grinding of the bushes, undergrowth, etc. will be effected by a plurality of elongated chopping blades 26 extending diagonally across the bottom surface 28 of the plate 18 and orientated in depending perpendicular relationship thereto. As will be best appreciated from FIGURE 6, several blades 26 are provided in spaced parallel relation to each other with each blade extending completely across the plate 18, on a diagonal, between the corresponding edges 20, 22, and/or 24. Each of the chopping blades 26, suitably provided with a beveled lower cutting edge 30, is affixed to the undersurface 28 of the plate 18 both by being welded directly thereto and by being bolted to a plurality of depending brackets 32 suitably affixed, as by welding, to the bottom surface 28 of the plate 18. The brackets 32 will normally be channel shaped with the bight or web portions 34 thereof having the corresponding blade 26 engaged thereagainst and bolted thereto by suitable nutted bolts 36. The legs or flanges 38 of each of the brackets 32, while maintaining the parallel relationship therebetween, converge inwardly toward the web 34 downward from the bottom surface 28 of the plate 18, noting FIGURE 7 in particular, thereby providing in effect a downwardly opening bracket which will be self-cleaning in nature. Likewise, inasmuch as the brackets 32, through the inclined or beveled edges of the flanges 38, result in an effective increase in the transverse width between the chopping blades 26 downward from the bottom surface 28 of the plate 18, there will be a tendency for any debris lodged between the blades 26 to fall freely therefrom, especially when considering the agitation or vibration which will be set up by the operation of the dragline 12 itself.

In order to handle the cutting operations, the unit 10 includes an elongated cutting blade 40 affixed along the rear edge 24 of the plate 18 and orientated at a rearward and slightly downward inclination relative thereto. This cutting blade 40, terminating in a sharpened cutting edge 42, is to be mounted on the rear edge 24 of the plate 18 both by being directly welded thereto and through the utilization of support brackets 44 welded to the undersurface 28 of the plate 18 adjacent the edge 24 and bolted, by nutted bolts 36, to the blade 40 which overlies the rearwardly projecting portion of each of the several brackets 44. These brackets 44 will also be generally channel shaped and include transverse webs 48 upon which the blade 40 engages and through which the mounting bolts 46 are projected. It will of course be appreciated that in the utilization of the cutting blade 40, the unit 10 will have to be orientated substantially vertically, much as in the manner illustrated in FIGURE 2.

The forward edge 22 is provided with a plurality of raking elements or teeth 50. Each of the teeth 50 is welded to both the upper surface 52 of the plate 18 and the front end edge 22, each tooth curving and tapering forwardly so as to terminate in a relatively sharp forward end 54 and simultaneously define an upwardly directed slightly concave seating portion 56 for the material to be raked by the teeth 50 as shall be described subsequently. In using these teeth 50 for, as an example, removing debris from the path of the cab of the track mounted dragline 12, the unit 10 will be orientated at a forwardly and downwardly inclined angle, noting FIGURE 3, so as to engage the teeth behind the material to be moved.

In order to mount the unit 10, on a conventional dragline 12, three mounting lugs are affixed to the upper surface 52 of the plate 18 along the rear edge 24 thereof with the two outer lugs 58 having a pair of coupling chains 60 secured thereto and converging toward a connecting device 62 which affixes the chains 60 to the drag cable 14. The third or center lug 64 affixes one end of the dump cable 66 to the plate, this dump cable extending over a pulley 68 supported by the hoist cable 16 and being suitably affixed to the connecting device 62 on the drag cable 14. A pair of bridle chains 70, affixed to the pulley 68 by a suitable shackle means 72, are engaged with the forward portion of the plate 18 by means of a pair of side positioned elongated mounting lugs or plates 74, thereby completing the suspension system for the unit 10. It will of course be appreciated that the various mounting lugs 58, 64 and 74 may be provided with a plurality of mounting holes so as to enable a variation in the positioning of the chain and cable ends as circumstances might dictate. Both the drag and hoist cables 14 and 16 will of course be wound on drums and controlled from the dragline cab in the normal manner.

Referring now specifically to the modified form of FIGURES 8 and 9, it will be appreciated that the instant invention also contemplates, in addition to the basic structure of the unit 10 described supra, the provision of an elongated cleaning bar 76 positioned between each pair of adjacent chopping blades 26 for vertical reciprocation therebetween in a manner tending to vibrate or force out any material which might tend to become trapped between the blades 26. Each of these cleaning bars 76 is mounted on the lower end of a plurality of mounting bolts 78 which project freely upward through a set of mounting holes 80 in the overlying portion of the plate 18. These bolts 78 project a substantial distance above the upper surface 52 of the plate 18 and terminate in enlarged heads 82. Each of the cleaning bars 76 is resiliently biased upwardly into engagement with the undersurface 28 of the plate 18 by means of an expanded coiled compression spring 84 engaged about the shank of the bolt 78 between the head 82 thereof and the upper surface 52 of the plate 18. In this manner, any vibration introduced into the unit 10, incorporating the cleaning bars 76, such as that effected by the unit 10 contacting the ground, will result in a slight downward movement of the individual cleaning bars 76 between pairs of blades 26, thus tending to assist in the discharge of any material wedged therein.

In normal operation, the unit 10 will be arranged as illustrated in FIGURE 1 with the plate 18 horizontal and the chopping teeth 26 vertically depending therefrom. In this position, the unit 10 will be repeatedly raised and dropped into engagement with the bushes, undergrowth, etc. so as to effect a complete chopping, pulverizing and driving of the material into the ground. During this operation, the vibrations introduced into the unit 10, the downwardly tapered bracket flanges 38, and in some instances the cleaning bars 76, will maintain the unit 10 substantially clean and free of material.

When a positive cutting action is needed, the elongated cutting bar 40 can be utilized as illustrated in FIGURE 2 wherein the hoist cable 16 is shortened and the drag cable 14 lengthened so as to position the unit 10 substantially vertically with the cutting blade 40 depending downward for engagement with the particular material, log, or the like to be cut.

FIGURE 3 illustrates the third operative position of the unit 10 with the toothed end 22 of the unit 10 being positioned lowermost so as to achieve a raking action as the dragline 12 is advanced. In this position, the angle of of the dragline boom to the ground is substantially reduced and the unit 10 moved rearwardly therealong to a position close to the dragline cab. At this point, the tooth bearing forward edge 22 of the unit 10 is angled downwardly at a substantial degree so as to enable a positioning of the teeth 50 behind the material to be moved. Upon an engagement of the material, the entire dragline apparatus 12 can be advanced, thereby enabling a clearing of the path for the dragline apparatus 12 by the unit 10 in advance of the track mounted cab. In addition, it will also be appreciated that, upon an engagement of the material to be moved by the teeth 50, the unit 10 itself can be moved forward along the boom through a utilization of the hoist cable 16.

From the foregoing, it will be appreciated that the unique device of the instant invention is particularly adaptable for use in normally inaccessible areas with the unit, through the unique arrangement of the working elements thereon, enabling the effective clearing of land in substantially a single operation, the debris being finely chopped and in effect ground into the earth, this being especially effective under swampy conditions wherein a proper clearing of the land is substantially impossible using more conventional bulldozers and/or manual labor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. A land clearing device adapted for use in conjunction with a boom equipped machine, said device comprising an enlarged base plate defined by upper and lower surfaces, and a peripheral edge, a plurality of elongated chopping members affixed directly to the lower surface of said plate in substantially perpendicular depending relation thereto, mounting means on said plate for engagement with an adjustable overhead support so as to enable a varying of the orientation of the device, an elongated cutting member fixed to a portion of the peripheral edge and projecting outwardly thereof so as to define a cutting edge, and a plurality of toothlike members fixed to a portion of the peripheral edge opposite said cutting member mounting edge portion, said tooth-like members being in spaced generally parallel relation to each other and projecting outwardly from said peripheral edge.

2. The device of claim 1, wherein said plate is rectangular, said peripheral edge comprising opposed parallel side edges and opposed parallel front and rear edges, said cutting member being coextensive with and mounted on said rear edge, said tooth-like members being mounted on said front edge at spaced points therealong.

3. The device of claim 2 wherein said chopping members extend diagonally completely across said plate in spaced parallel relation to each other.

4. The device of claim 3 wherein each of said tooth-like members includes upper and lower edges converging generally toward each other forward of said front edge so as to define a narrow point, the upper edge of each tooth-like member defining a generally upwardly directed concave seat for the reception therein of material to be moved.

5. The device of claim 3 including a cleaning bar between each pair of chopping members, and means mounting each cleaning bar for selective vertical movement between the corresponding chopping members so as to effect a discharge of material received therebetween.

6. A land clearing device adapted for use in conjunction with a vertically adjustable overhead support, said device comprising an enlarged base plate defined by upper and lower surfaces, opposed side edges, and opposed front and rear edges, a plurality of spaced parallel chopping blades extending diagonally across said plate, means for mounting said blades in depending perpendicular relationship to the lower surface of said plate, and mounting members rigidly affixed to the upper surface of said plate for releasably mounting said plate on an overhead support apparatus, said blade mounting means including a plurality of brackets affixed to the lower surface of the plate and depending therefrom adjacent each blade, each bracket including a portion thereof in parallel juxtaposition to the corresponding blade, and a mounting bolt locking said bracket portion to the adjoining blade, each bracket further including a tapered configuration progressively narrowing from the lower surface of the plate downward so as to provide for a widening of the effective space between adjacent chopping blades downward from the lower surface of the plate, thereby facilitating the discharge of material therefrom.

7. In combination, a boom equipped machine including an adjustable boom and power controlled hoist and drag cables, and a land clearing unit, said land clearing unit comprising a flat base plate defined by upper and lower surfaces, opposed side edges, and opposed front and rear edges, means engaging said drag cable with said plate adjacent the rear edge thereof, means engaging said hoist cable with said plate toward the front edge thereof, and a dump cable engaged between said plate adjacent the rear edge thereof and said drag cable with the intermediate portion thereof engaged over a pulley mounted on said hoist cable, whereby, through a manipulation of said cables, an orientation of said plate with either said rear edge or said front edge lowermost can be effected, an elongated cutting blade substantially coextensive in length with said rear edge, means mounting said cutting blade on said rear edge in rearwardly projecting relation thereto, and a plurality of forwardly projecting raking teeth affixed to said front edge, said teeth being laterally spaced from each other along said front edge.

8. The combination of claim 7 including a plurality of chopping blades orientated in spaced parallel relation to each other diagonally across said plate, and means rigidly affixing said chopping blades to the lower surface of said plate is depending perpendicular relationship thereto.

References Cited

UNITED STATES PATENTS

| 128,067 | 6/1872 | Reed | 172—607 |
|---|---|---|---|
| 542,880 | 7/1895 | Faris | 172—607 |
| 1,887,117 | 11/1932 | Colley | 37—116 |
| 2,304,282 | 12/1942 | Ross. | |
| 3,106,969 | 10/1963 | Carter | 172—197 |
| 3,135,061 | 6/1964 | Perry et al. | 37—116 |

ROBERT E. PULFREY, *Primary Examiner.*

E. H. EICKHOLT, *Assistant Examiner.*

U.S. Cl. X.R.

37—120; 172—26.5, 609